United States Patent [19]

Miyazaki et al.

[11] Patent Number: 4,780,650
[45] Date of Patent: Oct. 25, 1988

[54] CONTROL SYSTEM FOR A POWER CONVERTER FOR DRIVING INDUCTION MOTORS

[75] Inventors: Masanori Miyazaki, Hachioji; Yoshihiro Ogashi, Funabashi, both of Japan

[73] Assignee: Kabushiki Kaisha Toshiba, Kawasaki, Japan

[21] Appl. No.: 767,629

[22] Filed: Aug. 20, 1985

[30] Foreign Application Priority Data

Aug. 22, 1984 [JP] Japan ................................ 59-173356

[51] Int. Cl.$^4$ ............................................. H02P 5/40
[52] U.S. Cl. ...................................... 318/71; 318/112; 318/798
[58] Field of Search .................. 318/71, 52, 798, 806, 318/78, 112, 807–811

[56] References Cited

U.S. PATENT DOCUMENTS

| | | | |
|---|---|---|---|
| 3,916,275 | 10/1975 | Plunkett et al. | 318/808 |
| 4,314,190 | 2/1982 | Walker et al. | 318/808 |
| 4,451,771 | 5/1984 | Nagase et al. | 318/799 |
| 4,503,375 | 3/1985 | Okuyama | 318/802 |

*Primary Examiner*—David Smith, Jr.
*Attorney, Agent, or Firm*—Foley & Lardner, Schwartz, Jeffery, Schwaab, Mack, Blumenthal & Evans

[57] ABSTRACT

In a control system for a power converter for driving induction motors, the control system separately controlling an exciting current component of the primary current of the induction motors contributing to generation of a magnetic flux and a torque current component of the primary current contributing to generation of a torque, a voltage detecting device detects the output voltage of the power converter, and a correcting device responds to the voltage detecting device for determining a current correction for correcting at least one of the exciting current component and the torque current component to reduce the difference of the detected voltage from a reference value of the output voltage.

8 Claims, 4 Drawing Sheets

CONTROL SYSTEM FOR A POWER CONVERTER FOR DRIVING INDUCTION MOTORS

BACKGROUND OF THE INVENTION

The present invention relates to a control system for a power converter for driving induction motors which a primary current frequency driving the induction motors is controlled for the purpose of controlling the speed of the motors, and more particularly to such a control system having a function of separately controlling a current component of the induction motor primary current contributing to a magnetic flux generation and a current component contributing to torque generation. The former current component is called an exciting current component or an exciting current and the latter current component is called a torque current component or a torque current. Such separate control of the exciting current and the torque current is called a vector control and is known to provide a control performance similar to the control over a separately excited DC motor. In other words, by separate control of the exciting current, stable field control is possible while by separate control of the torque current, a speed response and a speed control accuracy are improved.

But where the system is used for driving a plurality of motors, there occurs a problem of over-voltage and over-excitation when the number of operating motors is reduced. There has not been a satisfactory solution to this problem.

SUMMARY OF THE INVENTION

An object of the invention is to provide a control system which is not costly, but has a satisfactory control response and stability against change in the number of the operating motors.

According to the invention, there is provided a control system (CS) for a power converter (PC) for driving induction motors (4), the control system separately controlling an exciting current component of the primary current of the induction motors contributing to generation of a magnetic flux and a torque current component of the primary current contributing to generation of a torque, wherein said control system comprises:

voltage detecting means (19) detecting the output voltage (V) of the power converter, and correcting means (21) responsive to the voltage detecting means for determining a current correction ($\Delta i$) for correcting at least one of the exciting current component and the torque current component to reduce the difference of the detected voltage (V) from a reference value (V$_0$) of the output voltage.

DETAILED DESCRIPTION OF THE PREFERRED EMBODIMENTS

Figure 1:
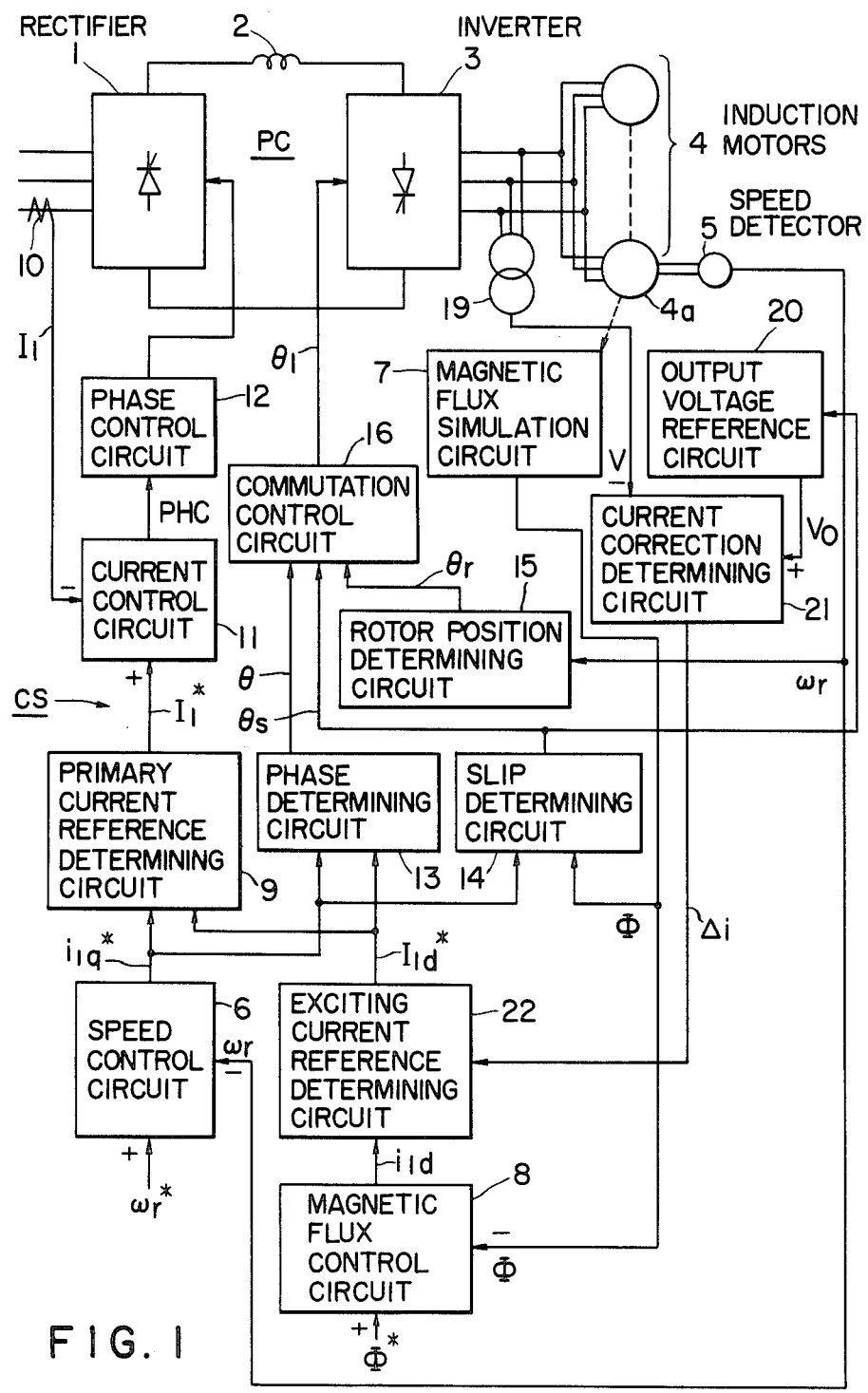
FIGS. 1 through 4 are block diagrams showing various embodiments of the invention.

FIG. 1 shows an embodiment of the invention.

The control system CS of this embodiment is adapted to control a power converter PC of a current-type inverter for driving induction motors 4. The power converter PC comprises a controllable rectifier 1 formed essentially of thyristors and having a function of controlling the magnitude of the total primary current of the induction motors 4. The power converter PC also comprises a DC reactor 2 for smoothing the DC current and a controllable inverter 3 formed essentially of thyristors, diodes, and commutation capacitors and having a function of controlling the frequency and the phase of the total primary current of the induction motors.

A control system CS for controlling the power converter PC comprises a speed detector 5 for detecing the speed of one (4a) of the induction motors 4 and producing a speed signal $\omega_r$ indicative of the detected speed, a speed control circuit 6 for determining the deviation of the speed signal from a speed reference $\omega_r^*$ and producing a reference $i_{1q}$ of a torque current component. A magnetic flux simulation circuit 7 calculates the amount of the magnetic flux in the induction motors 4 and produces a magnetic flux signal $\Phi$ indicative of the calculated amount of the magnetic flux. A magnetic flux control circuit 8 determines the deviation of the magnetic flux signal $\Phi$ from a magnetic flux reference $\Phi^*$ and produces a reference $i_{1d}^*$ of an exciting current component.

An exciting current reference determining circuit 22 determines, by calculation, a corrected or second exciting current reference $I_{1d}^*$ from the exciting current reference $i_{1d}^*$ and a current correction signal $\Delta i$, which will be later described, in accordance with the following equation:

$$I_{1d}^* = i_{1d}^* + \Delta i$$

A primary current reference determining circuit 9 determines, by calculation, the magnitude of the primary current (hereinafter referred to as a primary current reference) $I_1^*$ from the reference values $i_{1q}^*$ and $I_{1d}^*$.

A current detector 10 detects the magnitude of the primary current to the induction motors and produces a signal $I_1$ indicative of the magnitude of the primary current. A current control circuit 11 determines the deviation of the detected primary current $I_1$ from the primary current reference $I_1^*$ and produces a phase reference PHC. A phase control circuit 12 performs phase control over the rectifier 1 in accordance with the phase reference PHC. In this way, the magnitude of the primary current is controlled to be kept at $I_1^*$ by means of phase control over the rectifier 1.

A phase determining circuit 13 determines, by calculation, the angle $\theta$ between the primary current reference $I_1^*$ and the magnetic flux from the torque current reference $i_{1q}^*$ and the exciting current reference $I_{1d}^*$.

A slip determining circuit 14 determines, by calculation, from the torque current reference $i_{1q}^*$ and the magnetic flux signal $\Phi$, the slip angle $\theta_s$ of the induction motor. The slip angle $\theta_s$ is a time integral of the slip angular frequency $\omega_s$.

A rotor position determining circuit 15 determines, by calculation, from the speed signal $\omega_r$, the rotary angle $\theta_r$ of the induction motor 4a.

A commutation control circuit 16 determines, by calculation, from the angle $\theta$, the slip angle $\theta_s$ and the rotary angle $\theta_r$, the phase $\theta_1$ of the primary current in accordance with $$\theta_1 \theta + \theta_s + \theta_r$$

and controls the commutation of the inverter so that the phase of the primary current is kept at $\theta_1$.

A transformer 19 detects the output voltage of the inverter 3.

An output voltage reference circuit 20 determines, by calculation, the reference value $V_0$ of the output voltage from the output $\theta_s$ of the slip determining circuit 14.

A current correction determining circuit 21 determines the deviation of the detected output voltage V from the output voltage reference $V_0$ and determines, by calculation, the current correction $\Delta i$ of the exciting current in accordance with the following equation:

$$\Delta i = k \int (V_0 - V) dt$$

where k represents a constant.

The correction $\Delta i$ thus determined is, as was already mentioned, applied to the exciting current reference determining circuit 22 to correct the exciting current reference.

When a predetermined number (hereinafter referred to as "rated number") of induction motors are driven by a current-type inverter under vector control, the output voltage V as detected by the transformer 19 has a value corresponding to the operating speed of the induction motors 4. On the other hand, the output voltage reference $V_0$ as determined by the output voltage reference circuit 20 has a value corresponding to the operating speed of the induction motors 4. As mentioned before, the exciting current correction signal for correcting the exciting current reference $i_{1d}*$ is determined by the current correction determining circuit 21 in accordance with the output voltage V and the output voltage reference value $V_0$. When the rated number of induction motors are driven and $V = V_0$, the correction signal $\Delta i$ is zero, so that no correction is applied to the exciting current reference.

Assume that one or more of the rated number of induction motors 4 stop. The exciting current component required by the remaining induction motors will become smaller than the exciting current reference $i_{1d}*$. Stated conversely, the exciting current reference $i_{1d}*$ becomes too large. As a result, the terminal voltage of the induction motor rises, so that there occurs a difference between the output voltage V and the output voltage reference value $V_0$, and hence the current correction $\Delta i$ will have a certain magnitude (other than zero). The correction $\Delta i$ is used in the exciting current reference determining circuit 22 to correct the exciting current reference $i_{1d}*$ to result in $I_{1d}*$. The corrected exciting current reference $I_{1d}*$ is inputted to the primary current reference determining circuit 9 and is used to determine the primary current reference $I_l*$ having an appropriate exciting current component for the remaining induction motors. In this way stable operation of the induction motors is continued.

It should be noted that torque current reference $i_{1q}*$ is properly determined in accordance with the operating condition of the motors and is not adversely affected by the change in the number of the operating motors.

As has been described, the output voltage of the inverter is detected and the exciting current component is corrected in accordance with the detected output voltage, so that over-voltage and overexcitation in the event of change in the number of the operating motors are prevented and stable operation is ensured.

Figure 2:
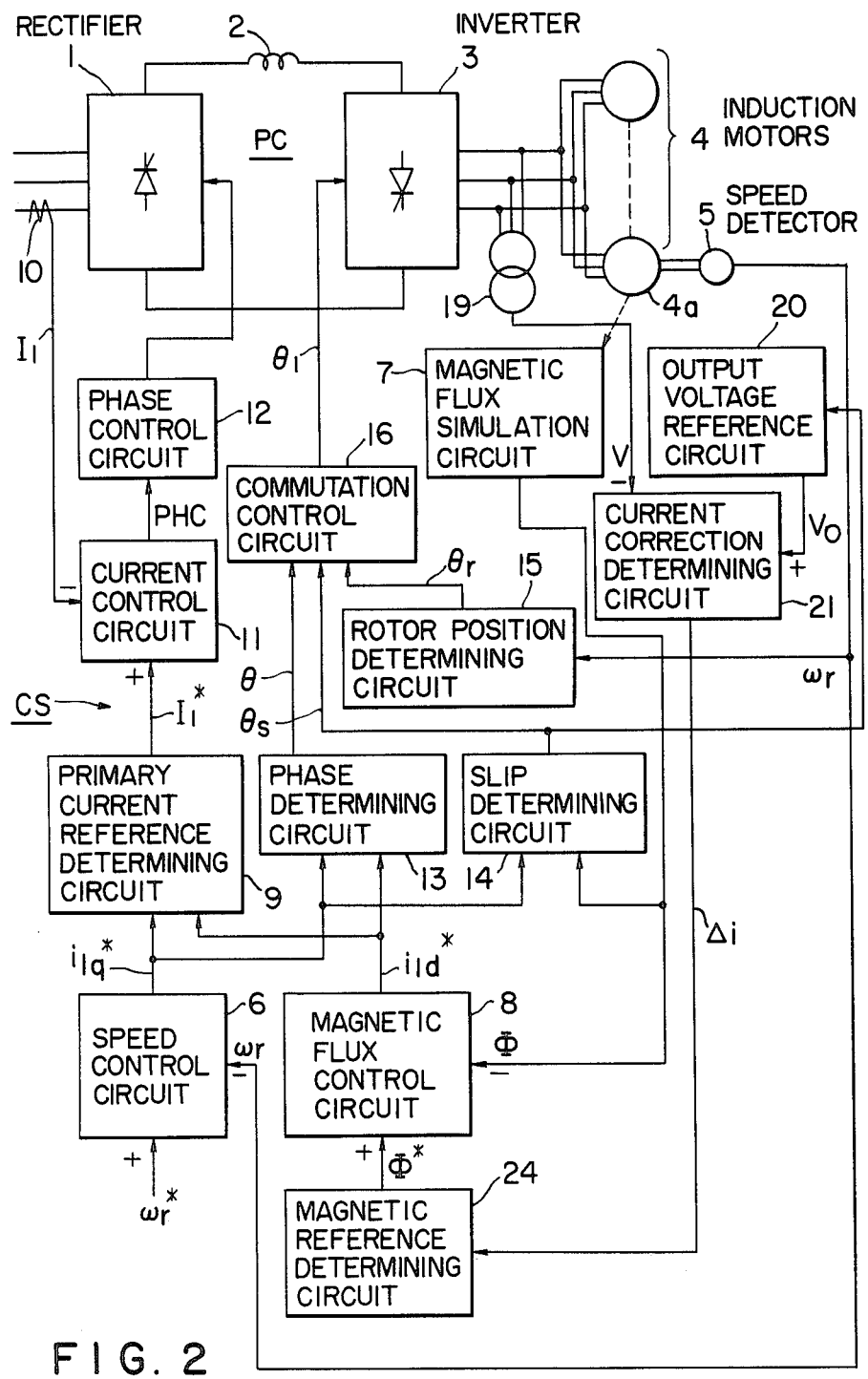

FIG. 2 shows another embodiment of the invention. The same reference numerals as in FIG. 1 denote the same or similar circuits.

A magnetic flux reference determining circuit 24 determines, from the current correction $\Delta i$, a magnetic flux reference $\Phi*$ in accordeance with the following equations:

$$\Phi* = \Phi*_0 + k'\Delta i$$

where
$\phi_0*$ represents an initial set value of the magnetic flux reference, and
k' represents a constant.

The magnetic flux reference $\phi*$ thus determined is fed to the magnetic flux control circuit 8.

Figure 3:
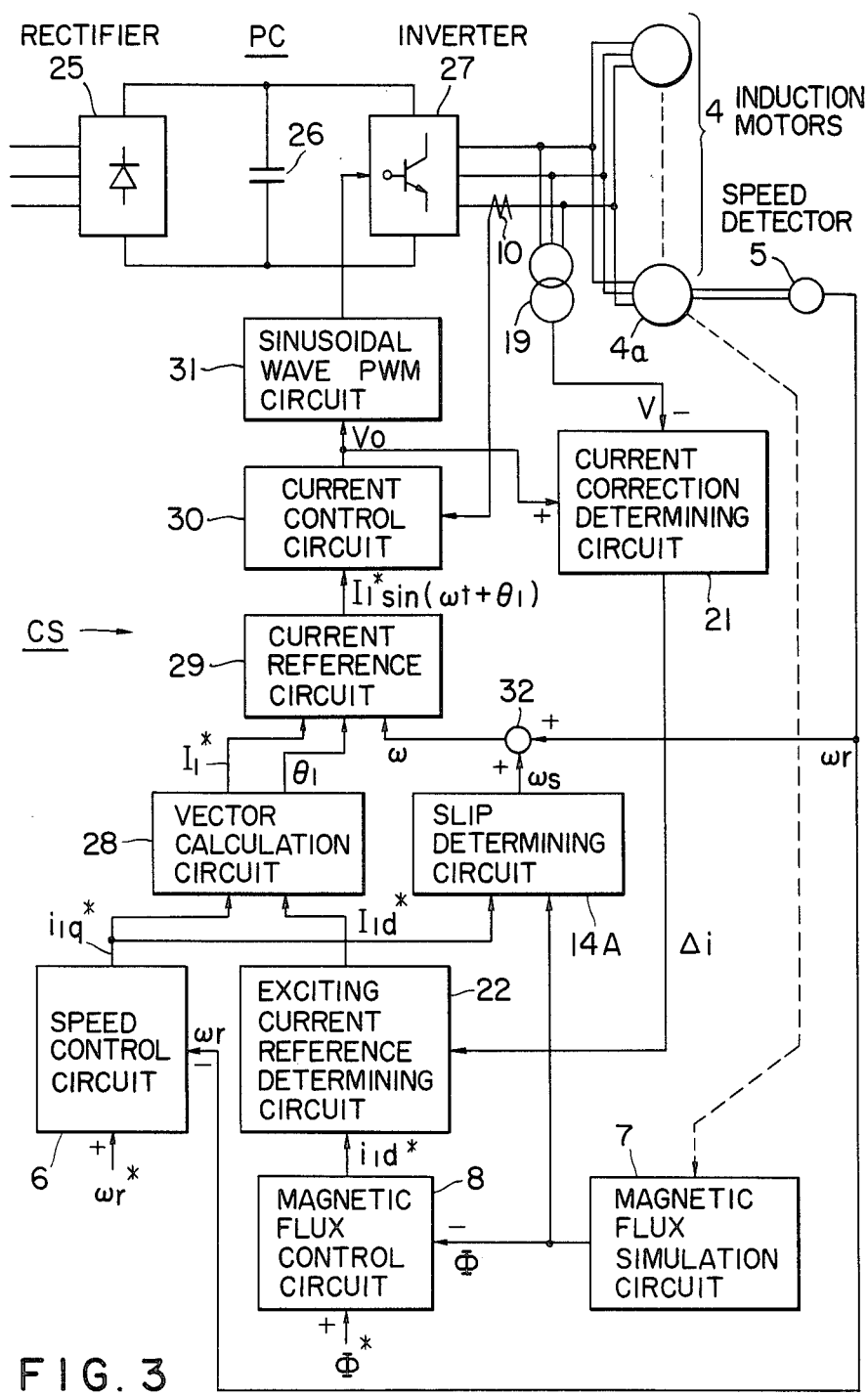

FIG. 3 shows a further embodiment of the invention. The power converter PC controlled by the control system of this embodiment comprises a rectifier 25 for rectifying an AC input, a smoothing capacitor 26 for smoothing the DC voltage, and a PWM-controlled inverter 27 capable of converting the DC voltage into an AC voltage of a desired voltage and a desired frequency.

A slip determining circuit 14A of this embodiment determines a slip angular frequency $\omega_s$. An adder 32 adds the slip angular frequency $\omega_s$ and the angular frequency $\omega_r$ of the motor 4a as detected by the speed detector 5 to determine the angular frequency $\omega$ of the primary current.

A vector calculation circuit 28 determines, by calculation, the primary current reference $I_1*$ and the phase $\theta_1$ of the primary current from the exciting current reference $I_{1d}*$ and the torque current reference $i_{1q}*$ in accordance with the following equations:

$$I_1* = \sqrt{i_{1q}{}^{2*} + I_{1d}{}^{2*}}$$

$$\theta_1 = \tan^{-1}(_{1q}/I_{1d}*)$$

A current reference circuit 29 receives $I_1*$, $\theta_1$ and $\omega$ and produces a signal representing a sinusoidal wave reference:

$$I_1*\sin(\omega t + \theta)$$

of the primary current.

A current control circuit 30 compares the primary current as detected by the current detector 10 and the sinusoidal wave reference $I_1* \sin(\omega t + \theta)$ from the reference circuit 29 and produces an output voltage reference $V_0$ for controlling the primary current.

A sinusoidal wave PWM circuit 31 is responsive to the output voltage reference $V_0$ and performs PWM (pulse width modulation) control over the inverter 27. The PWM control is for chopping the output of the inverter to make the output current effectively identical to the sinusoidal wave. In this way the voltage and the phase are controlled at the inverter 27.

Instead of the PWM-controlled inverter, the power converter may comprise a cyclo-converter. A control system similar to that shown in FIG. 3 may be used for controlling the cyclo-converter.

Figure 4:
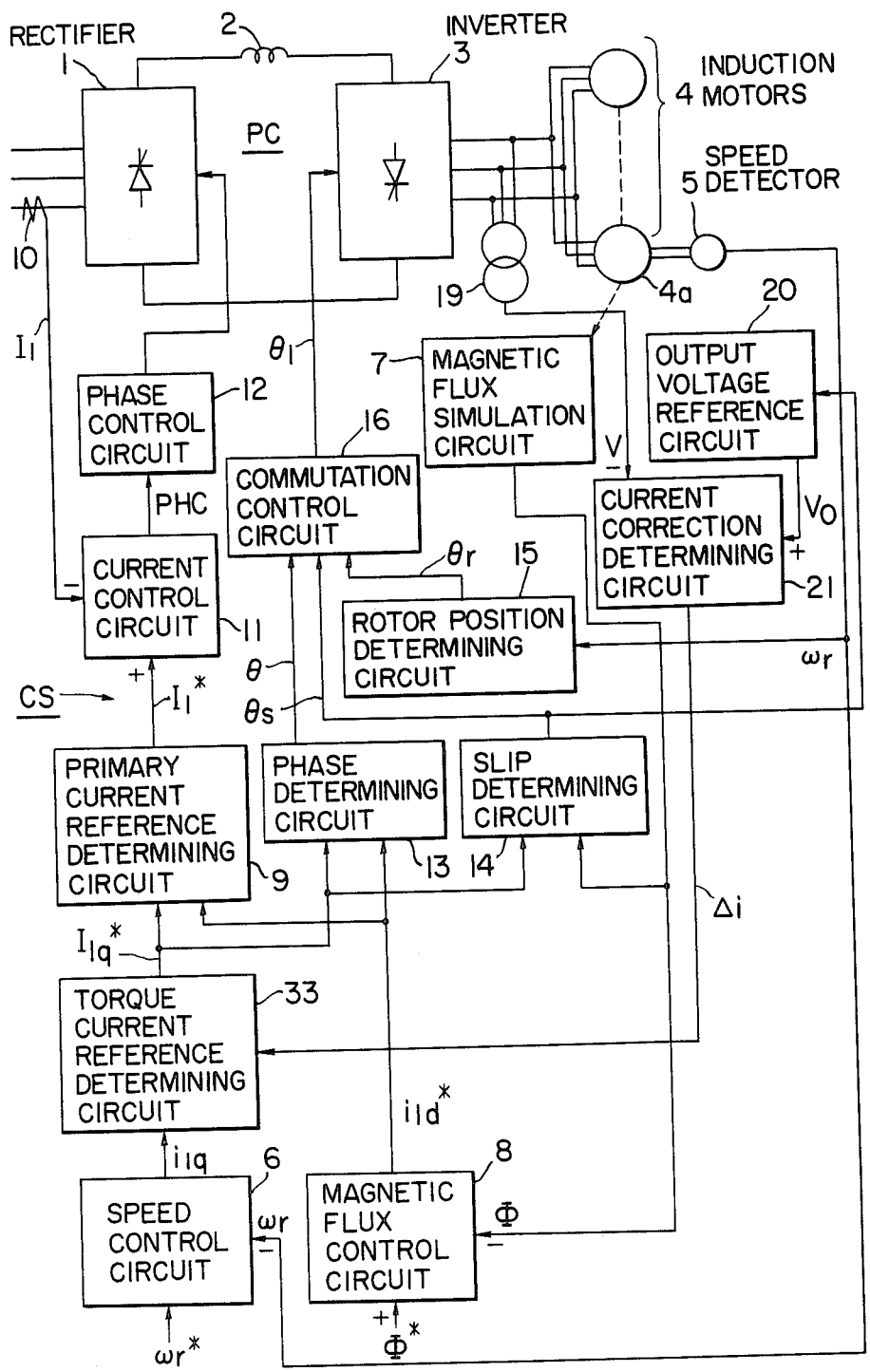

FIG. 4 shows a further embodiment of the invention. This embodiment is similar to the embodiment of FIG. 1 except that the exciting current reference determining circuit 22 is omitted and a torque current reference determining circuit 33 is provided to receive the correction $\Delta i$ and correct the torque current reference $i_{1q}*$ to produce a corrected torque current reference $I_{1q}*$. The corrected torque current reference $I_{1q}*$ is used in place of $i_{1q}*$ for $I_1*$, $\theta$ and $\theta_s$ at the circuits 9, 13 and 14.

The correction of the torque current reference responsive to the deviation of the detected output voltage V produces a similar effect as was obtained with the correction of the exciting current reference.

As a further alternative, the slip angle $\theta_s$ or the slip angular frequency $\omega_s$ used for determining $\theta_s$ may be corrected responsive to the deviation of V. The correction of $\theta_s$ or $\omega_s$ is essentially identical to correction of $i_{1q}^*$. The reference to correction of the torque current as used in the appended claims should therefore be construed to cover correction of the slip angle or the slip angular frequency.

What is claimed is:

1. A system comprising:

a pluraity of induction motors;

a power converter for driving said plurality of induction motors; and a control system for separately controlling an exciting current component of the primary current of the induction motors contributing to generation of a magnetic flux and a torque current component of the primary current contributing to generation of a torque, said control system comprising:

voltage detecting means for detecting the value of hte output voltage of the power coverter, and means for determining whether a predetermined number of induction motors are operating by comparing said value of said output voltage with a predetermined value; and correcting means responsive to a determination that a predetermined number of said plurality of induction motors are not operating for adjusting one of exciting current component and torque current component to be appropriate for the remaining motors.

2. A system of claim 1, further comprising:

means for detecting the speed of one of the induction motors, speed control means responsive to a speed reference and the detected speed for producing a torque current reference, magnetic flux control means responsive to a magnetic flux reference and the actual magnetic flux for determining an exciting current reference, means responsive to the torque current reference and the exciting current reference, for determining the magnitude and the phase of the primary current of the induction motors, and means for controlling the power converter in accordance with the magnitude and the phase of the primary current.

3. A system of claim 2, further comprising means for adding the current correction to the exciting current reference for correcting the exciting current reference.

4. A system of claim 2, further comprising magnetic flux reference determining means responsive to the current correction for determining the magnetic flux reference.

5. A system of claim 2, further comprising means responsive to the current correction for correcting the torque current reference.

6. A system of claim 2, wherein the power converter comprises a current type inverter system comprising a rectifier and an inverter, and said means for controlling the power converter comprises means responsive to the magnitude of the primary current for controlling the magnitude of the current of the rectifier, and said inverter is so controlled that its output current has the phase as determined by said means for determining the phase of the primary current.

7. A system of claim 2, wherein the power converter comprises a PWM-controlled inverter, said control system further comprising means responsive to the magnitude and the phase of the primary current for controlling the PWM-controlled inverter.

8. A system of claim 2, wherein the power converter comprises a cyclo-converter, said control system further comprising means responsive to the magnitude and the phase of the primary current for controlling the cyclo-converter.

* * * * *